US007498952B2

(12) United States Patent
Newman, Jr.

(10) Patent No.: US 7,498,952 B2
(45) Date of Patent: Mar. 3, 2009

(54) REMOTE CONTROL LIGHTING CONTROL SYSTEM

(75) Inventor: Robert C. Newman, Jr., Emmaus, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 250 days.

(21) Appl. No.: 11/446,876

(22) Filed: Jun. 5, 2006

(65) Prior Publication Data

US 2006/0284734 A1 Dec. 21, 2006

Related U.S. Application Data

(60) Provisional application No. 60/687,894, filed on Jun. 6, 2005.

(51) Int. Cl.
*G08B 5/22* (2006.01)
*H04B 20/71* (2006.01)

(52) U.S. Cl. ................ 340/815.45; 455/3.05; 455/90.1; 307/139

(58) Field of Classification Search .............. 340/815.4, 340/815.45; 370/315, 226; 455/3.03, 3.05, 455/7, 9, 19, 90.1, 90.2, 90.3; 307/113, 115, 307/139, 140, 143; 315/129, 133, 34, 291, 315/DIG. 4
See application file for complete search history.

(56) References Cited

U.S. PATENT DOCUMENTS 3,550,137 A 12/1970 Kuecken
4,995,053 A 2/1991 Simpson et al. ................ 375/1
5,031,082 A 7/1991 Bierend et al.
5,170,068 A 12/1992 Kwiatkowski et al. ........ 307/31
5,225,847 A 7/1993 Roberts et al.
5,237,207 A 8/1993 Kwiatkowski et al. ........ 307/31
5,726,644 A 3/1998 Jednacz et al.
5,736,965 A * 4/1998 Mosebrook et al. .......... 343/702
5,838,226 A * 11/1998 Houggy et al. ......... 340/310.01

(Continued)

FOREIGN PATENT DOCUMENTS

EP 0 646 984 A1 4/1995

(Continued)

OTHER PUBLICATIONS

Patent Abstracts of Japan, vol. 018, No. 672 (E-1646), Dec. 19, 1994 & JP 06 267660 A (Hitachi Lighting LTD), Sep. 22, 1994.

(Continued)

*Primary Examiner*—Thuy Vinh Tran
(74) *Attorney, Agent, or Firm*—Ostrolenk, Faber, Gerb & Soffen, LLP

(57) ABSTRACT

A two-way radio frequency lighting control system comprises a master control including a plurality of manual actuators, and a plurality of dimmers, in which the number of dimmers does not exceed the number of manual actuators. After the lighting control system is installed in an intended end user location, and prior to the first time the lighting control system is energized in the intended end user location, each of the manual actuators is operative to affect the status of one, and only one, of the plurality of dimmers. A turn key lighting control system in which there is a one-to-one correspondence of manual actuators to dimmers is thereby provided.

28 Claims, 7 Drawing Sheets

U.S. PATENT DOCUMENTS

| | | | | | |
|---|---|---|---|---|---|
| 5,848,054 | A | * | 12/1998 | Mosebrook et al. | 370/226 |
| 5,905,442 | A | * | 5/1999 | Mosebrook et al. | 340/3.7 |
| 5,909,087 | A | * | 6/1999 | Bryde et al. | 315/149 |
| 5,982,103 | A | * | 11/1999 | Mosebrook et al. | 315/149 |
| 6,104,354 | A | | 8/2000 | Hill et al. | |
| 6,144,346 | A | | 11/2000 | Boy | |
| 6,380,696 | B1 | * | 4/2002 | Sembhi et al. | 315/294 |
| 6,545,434 | B2 | * | 4/2003 | Sembhi et al. | 315/312 |
| 6,687,487 | B1 | | 2/2004 | Mosebrook et al. | 455/11.1 |
| 6,803,728 | B2 | | 10/2004 | Balasubramaniam et al. | 315/149 |
| 6,927,547 | B2 | | 8/2005 | Walko, Jr. et al. | 315/316 |
| 7,362,285 | B2 | * | 4/2008 | Webb et al. | 343/866 |
| 2005/0102040 | A1 | | 5/2005 | Kruse et al. | 700/9 |
| 2006/0044152 | A1 | | 3/2006 | Wang | |

FOREIGN PATENT DOCUMENTS

| | | |
|---|---|---|
| JP | 6-267660 | 9/1994 |

OTHER PUBLICATIONS

Lutron Electronics Co., Inc., “Wallbox Lighting Control Catalog”, Jun. 1999.
International Search Report dated Sep. 18, 2006.
“LuMaster and Network Central Home Lighting Control Systems”, Wallbox Lighting Control Catalog, Jun. 1999, cover, pp. 44-45, rear cover.

* cited by examiner

REMOTE CONTROL LIGHTING CONTROL SYSTEM

RELATED APPLICATIONS

This application claims priority from commonly-assigned U.S. Provisional Application Ser. No. 60/687,894, filed Jun. 6, 2005, having the same title as the present application, the entire disclosure of which is hereby incorporated by reference.

BACKGROUND OF THE INVENTION

1. Field of the Invention

The present invention relates, generally, to remote control systems, and, more particularly, to a pre-programmed radio frequency (RF) control system and method for controlling one or more lighting controls.

2. Description of the Related Art

Systems for controlling an electrical device by remote control are known. For example, prior art systems and methods control the status of electrical devices such as electric lamps, from a remote location via communication links, including radio frequency links, power line carrier links or infrared links. Status information regarding the electrical devices (e.g., on, off and intensity level) is typically transmitted between specially adapted lighting control devices and at least one master control unit. At least one repeater device may also be provided to help ensure reliable communications between the master control unit and the control devices for the respective electrical devices. The repeater may be required when a control device is unable to receive control signals transmitted directly from the master control unit, and, typically, employs a repeater sequence for helping to ensure that each receiver receives those signals intended for it.

Although the present invention is directed particularly to lighting controls, the present invention can be applied to communication signals relating to the control of status of other kinds of devices, such as, for example, fan motors and motorized window treatments.

Referring now to the drawing figures, in which like reference numerals refer to like elements, there is shown in FIG. 1 a prior art arrangement of a system 100 for remote control of electrical devices. The example prior art system 100 illustrated in FIG. 1 includes configurable devices that are manufactured by the assignee of the present patent application and commercially known as the RadioRA® lighting control system. The RadioRA® lighting control system is described in greater detail in commonly assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

As shown in FIG. 1, the hardware devices include a master control unit 102, two control devices 104, a repeater 106, a car visor control 108 that may be mounted on an automobile's sun visor, and two electrical devices 110, e.g., lamps. The devices 102, 104, 106 and 108 transmit radio frequency signals 112, which can include control information and instructions regarding the respective electrical devices 110.

In the prior art system 100 illustrated in FIG. 1, the control devices 104 are coupled to electrical devices 110 by wire connections, such as, for example, building wiring for providing power to electrical devices. Each control device 104 includes a communications and control circuit 114 that comprises a radio frequency transmitter/receiver 116 and an antenna 118 for transmitting/receiving the radio frequency signals 112. The communications and control circuit 114 further includes a controller 120 for adjusting the status of the attached electrical device 110. The transmitter/receiver 116 receives the radio frequency signals via the antenna 118 and transmits a status radio frequency signal with information regarding the status of the controller 120 (which indirectly reflects the status of the connected electrical device 110). The controller 120 adjusts the status of the electrical device in response to the control information. Each control device 104 further includes button(s) 122 and dimmer control(s) 124, which are further operable to allow manual adjustment of the connected electrical device 110.

The master control unit 102 includes at least one actuator 126, at least one status indicator 128, a transmitter/receiver 116, and an antenna 118. The actuators 126 enable a user to control the electrical devices 110 remotely. The status indicators 128 indicate the status of the electrical devices 110. The transmitter/receiver 116 and the antenna 118 are operable for transmitting a radio frequency signal 112 having the control information therein to control the status of the electrical devices 110, as well as for receiving status information from the control devices 104.

The master control unit 102 can take several forms. For example, the master control unit 102 can be formed as a tabletop master, which plugs into an electrical outlet and includes a conventional antenna for transmitting and receiving signals. In another form, the master control unit 102 mounts on a wall, and is sized such that the master control unit 102 fits within the confines of a standard electrical wall box. In either form, the master control unit 102 includes a plurality of controls, each associated with a particular control device or a plurality of control devices. In the prior art, the user must program the association of the electrical control devices to a particular actuator 126 on the master control unit. Further, prior art master control units 102 must be programmed in order to provide functions allowing all control devices 104 to turn on or off substantially simultaneously.

The repeater 106 may receive radio frequency signals 112 (including status information and instructions) from the master control unit 102 and, thereafter, transmit radio frequency signals 112 to the control devices 104. Further, the repeater 106 may receive radio frequency signals 112 from the control devices 104 and, thereafter, transmit them to the master control unit 102.

The car visor control 108 provides a convenient and remotely usable interface to transmit radio frequency signals 112 to the master control unit 102, and may be disposed in a vehicle, for example, on a vehicle's interior sun visor. The buttons 130 are provided for remotely activating the master control unit 102. For example, the car visor control 108 can be used to cause a lighting scene to turn on/off, or may be operated to turn the electrical devices 110 on/off via the master control unit 102.

Thus, the master control unit 102 is operable to generate radio frequency signals, which are transmitted to and received by the control devices 104, such as light dimmers, and/or the repeater 106. The control devices 104 use the information received in the radio frequency signals 112 to control the connected electrical devices 110 to a desired intensity. The control devices 104 preferably transmit radio frequency signals 112 via antennas 118 to the master control unit 102 (or to the master control unit 102 via the repeater 106) in order to indicate the status of the control devices 104 (and thus, the connected electrical devices 110). Using the respective devices, a combination of lighting controls in different or the same rooms of a structure, for example, can be instructed to turn on/off, thereby creating a lighting "scene" according to a user's desire.

Lighting control devices 104 preferably fit into standard electrical wall boxes. The antenna 118, which comprises a part of each control device 104, is sized so as to fit within the standard electrical wall box or at least within the area defined by the faceplate for the opening of a standard electrical wall box.

Thus, systems that provide two-way transmission/reception communications to allow the reception of signals to operate remotely an electric lamp or other electrical device as well as the transmission of signals to enable a control device 104 to transmit information regarding the status of an affected electrical device 110 to a remote location are known.

Although the prior art remote systems function to integrate with prior art switches and to provide remote control of electrical devices, various shortcomings and inconveniences exist which negatively impact the consumer and the market. Examples of such shortcomings are described below.

In one notable example, prior art remote control systems, such as described above, place a technical requirement on the user (or the installer) to set up and configure the master control unit 102, control devices 104, and repeater 106. After a prior art remote electrical device control system is purchased and wired to an existing electrical system, a user must configure the system to enjoy the respective functionality thereof. For example, a user must activate repeater(s) 106, control devices 104 (including dimmer controls) and master control unit 102 before a prior art remote control system can be used. After the system is activated, the master control unit 102 is typically programmed so that, for example, one or more master control unit 102 buttons can control a light or group of lights. Furthermore, each control device 104 must be configured to correspond with respective buttons on master control unit 102. Other functionality provided by prior art remote control systems that must be programmed and/or configured by a user include: assigning dimmers, switches, and sensor units to specific room buttons; setting light levels and lighting scene selection for specific room buttons; assigning dimmers, switches and sensors to scene buttons; programming a button of a master control unit 102 to turn all electrical devices on and off; copying button programming; erasing button programming; adding auxiliary repeaters; adding controls; activating switch closure interfaces; assigning dimmers, switches and/or sensor devices to input channels; and setting light levels and/or scene selection for input channels.

The programming/configuration requirements placed on a user of prior art remote control systems are considered fairly complex, and in order to assist the user with configuration and programming, prior art systems may be distributed with a hand-written programming worksheet to be used by the user to set up or change the configuration of a system. For example, a user writes, in a worksheet, descriptions of associations of the respective devices, as well as the various functionality provided by respective buttons provided on the devices. Accordingly, the user refers to the hand-written worksheet in order to effect changes to the system, and/or for troubleshooting purposes.

It is believed by the inventors that configuring prior art remote control systems can be tedious, complicated, and time-consuming, particularly for members of the residential retail market. Many consumers find prior art remote control systems simply too complicated to install and configure, and, accordingly, do not invest in remote control systems, notwithstanding the convenience and enjoyment such systems ultimately provide. Furthermore, changes to handwritten worksheets may be hard to make, such as when a system is modified or components replaced. Also, handwritten worksheets can get lost or damaged (e.g., liquids spilled thereon), which further complicates the ability for a user, particularly a residential consumer, to use and enjoy prior art remote control systems.

Another shortcoming of prior art remote control systems regards defining a unique address to prevent interference with neighboring systems. When, for example, two neighbors that live within a pre-defined transmission range purchase prior art remote control systems, each neighbor may adversely affect the status of the other's electrical devices. A user's lights may turn on, off, dim, and brighten each time the neighbor operates his system. Accordingly, prior art remote control systems require users to define a unique "house" or system address by supplying a bit address in the range of 0-255. Once defined, a prior art remote control system can broadcast radio frequency signals with the assurance that no neighboring system will receive and respond to the transmissions. Unfortunately, configuring the system with a unique house address is an additional technical burden placed on the user, and represents another shortcoming of the prior art.

Yet another shortcoming of prior art remote control systems regards the amount and frequency of information that is transmitted from the control device 104 to the master control unit 102, especially while the user affects the status of the electrical device 110 using a dimmer. For example, using a prior art remote control system, a user adjusts the brightness of a light via a dimmer. In the prior art, while adjustments are made to the status of an electric light (e.g., dimming the light), information regarding the status of the light is transmitted to the master control unit 102, even if the user has not completed adjusting the brightness level of the light. Thus, for example, as a user decreases, increases, and then again decreases the brightness of the light while determining the precise setting he desires, information is repeatedly transmitted to the master control unit 102 after each adjustment. Prior art systems that repeatedly transmit information from the control device 104 to the master control unit 102 prior to a user completing adjustments to the status of the electrical device 110 are inefficient.

Yet another shortcoming of prior art remote control systems regards control devices 104 comprising dimmer controls. In prior art radio frequency remote control systems, dimmers are typically provided with rocker switches or other kinds of switching mechanisms. Unfortunately, a rocker switch does not provide the same degree of control as a slider control. Therefore, it is considered by the inventors that an additional shortcoming of prior art remote control systems, particularly with respect to radio frequency remote controls, is that dimmers are not provided with slider controls.

SUMMARY OF THE INVENTION

According to a first embodiment of the present invention, a system for remotely controlling at least two electrical devices comprises a master control unit and at least two control devices. The master control unit is operable to transmit signals containing control information for controlling the electrical devices. The at least two control devices are operable to receive the signals from the master control unit. Each of the control devices is respectively electrically connected to at least one of the electrical devices and is responsive to the control information for controlling the at least one of the electrical devices. The control information includes a unique identifier of at least one of the control devices. The master control unit and the control devices are pre-configured such that the master control unit is operable to transmit the signals to the control devices, and the control devices are operable to receive the signals from the master control unit and control the status of the at least one electrically connected electrical device in response to the control information containing the address of the respective control device, immediately upon installing and providing power to the system in a building structure.

According to another embodiment of the present invention, a two-way radio frequency lighting control system comprises a master control and a plurality of dimmers. The master control includes a plurality of manual actuators. The number of dimmers does not exceed the number of manual actuators. After the lighting control system is installed in an intended end user location, and prior to the first time the lighting control system is energized in the intended end user location, each of the manual actuators is operative to affect the status of one, and only one, of the plurality of dimmers. According to yet another embodiment of the present invention, after the lighting control system is installed in an intended end user location, and prior to the first time the lighting control system is energized in the intended end user location, there is a one-to-one correspondence of dimmers to actuators such that each of the plurality of dimmers is adapted to have its status affected by actuation of one, and only one, of the plurality of actuators.

The present invention further provides a lighting control system that comprises a master control and a plurality of dimmers. The master control includes a plurality of master manual actuators; a master controller, operatively coupled to the master manual actuators; a plurality of master status indicators, operatively coupled to the master controller; a master radio frequency transmitter-receiver, operative coupled to the master controller; and a master antenna, operatively coupled to the master transmitter-receiver. Each of the plurality of dimmers includes a dimmer manual on/off actuator; a dimmer slider actuator; a dimmer controller, operatively coupled to the dimmer manual on/off actuator and to the dimmer slider actuator; a dimmer controllably conductive device, operatively coupled to the dimmer controller; a dimmer radio frequency transmitter-receiver, operatively coupled to the dimmer controller; and a dimmer antenna, operatively coupled to the dimmer radio frequency transmitter-receiver. The number of dimmers not exceeding the number of master manual actuators. The master controller and each of the plurality of dimmer controllers are programmed prior to installation in an intended end user location, such that each master manual actuators is operative to cause a change in status of one, and only one, of each of the plurality of dimmers.

In addition, the present invention provides a dimmer control operable to adjust a status of a connected electrical lamp in response to a radio frequency control signal received from a remote control device. The dimmer control comprises a communication and control circuit, a manual actuator, and a slider control. The communication and control circuit includes at least a radio frequency transmitter/receiver and an antenna operable to receive a radio frequency signal from the remote control device that includes control information for controlling the status of the electrical lamp. The manual actuator is operable to change the on/off status of the electrical lamp, while the slider control is operable to change the dimming status of the electrical lamp to dim the electrical lamp. The communication and control circuit is operable to transmit to the remote control device status information representing the changed status of the electrical lamp, or the setting of the slider control, or both.

The present invention further provides a method of dimming an electrical lamp electrically connected to a control device in response to a radio frequency control signal received from a remote control device. The method comprises the step of providing the control device with a communication and control circuit comprising at least a radio frequency transmitter/receiver and an antenna, a manual actuator operable to change the on/off status of the electrical lamp, and a slider control operable to change the dimming status of the electrical lamp. The communication and control circuit is operable to receive the radio frequency control signal. The method further comprises the steps of receiving the radio frequency control signal that includes control information for controlling the status of the electrical lamp; controlling the status of the lamp in response to the control information; dimming the electrical device as a function of the position of the slider control; and transmitting by the communication and control circuit status information representing the changed status of the electrical lamp to the remote control device.

According to another aspect of the present invention, a method for providing a remote control system operable to control at least two electrical devices comprises the steps of: providing a master control unit operable to transmit signals containing control information for controlling the electrical devices, and providing at least two control devices. Each of the control devices is respectively electrically connected to at least one of the electrical devices and is responsive to the control information to control the at least one of the electrical devices. The control information includes a unique identifier of at least one of the control devices. The method further comprises the step of pre-configuring the master control unit and the control devices such that the master control unit is operable to transmit signals to the control devices, and the control devices are operable to receive the signals from the master control unit and control the status of the at least one electrically connected electrical device in response to the control information containing the address of the respective control device, immediately upon installing and providing power to the master control unit and the control devices in a building structure.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form, which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF EMBODIMENTS OF THE INVENTION

Figure 1:
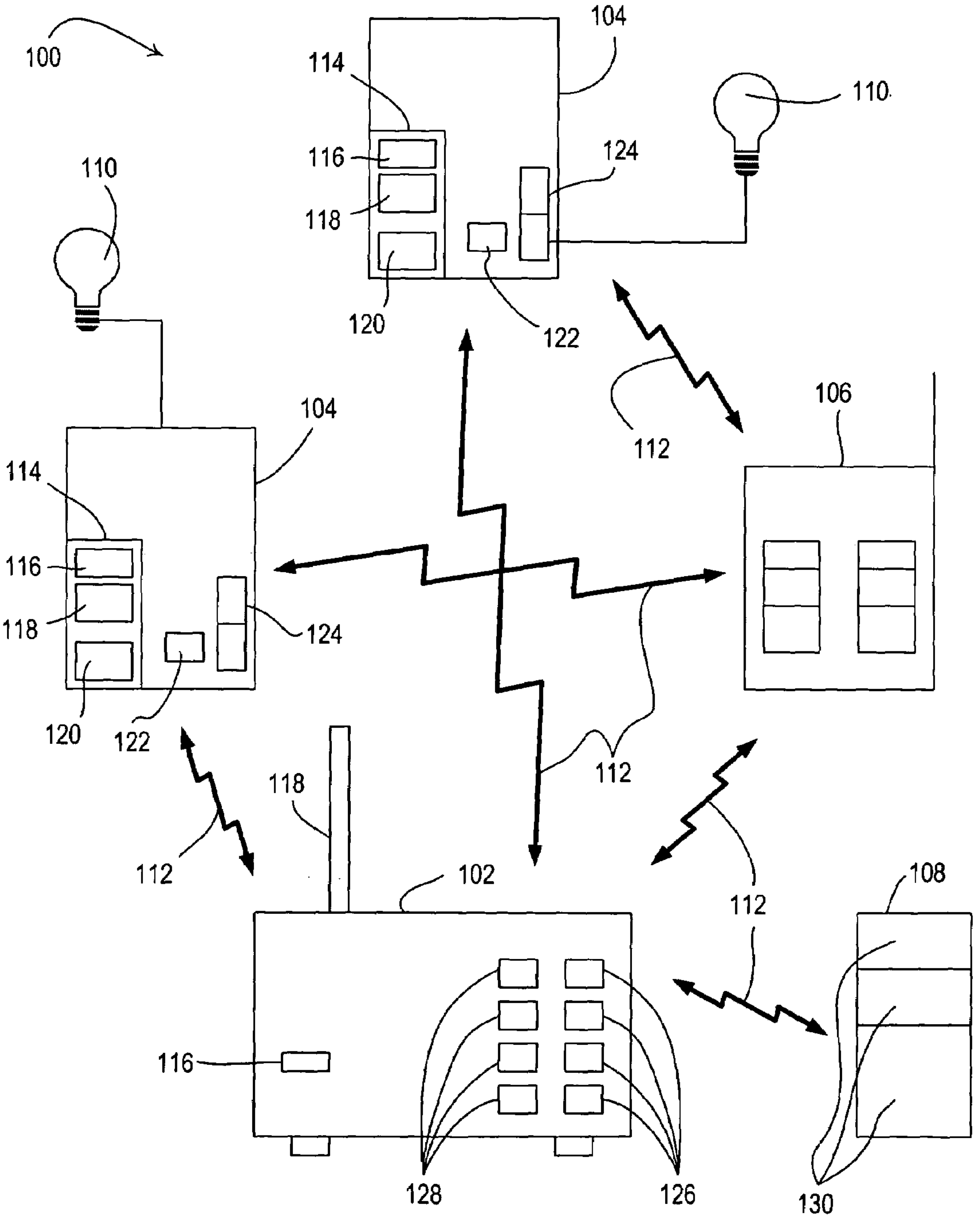
FIG. 1 PRIOR ART
FIG. 1 illustrates a prior art arrangement of a radio frequency system for remote control of electrical devices.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

According to one aspect, the present invention is directed to a wireless radio frequency (RF) control system for controlling electrical devices, for example installed in a building structure such as a residential home, and made available in a retail market. In a preferred embodiment, a remotely and manually controllable control device replaces a conventional mechanical electrical switch, and operates without requiring setup and/or configuration by a user thereby reducing the time and resources required for the installation of prior art remote control systems.

Figure 2:
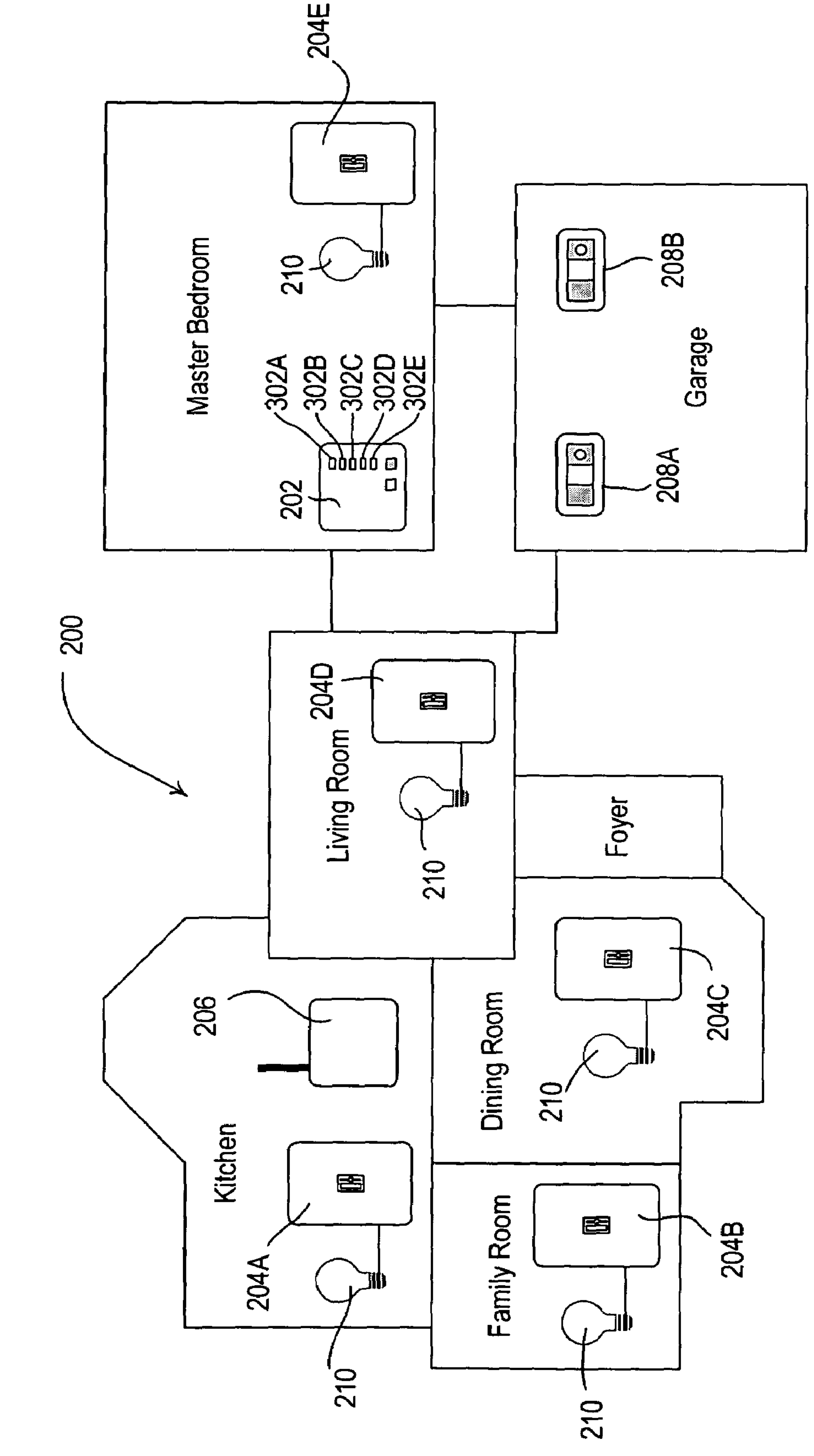
FIG. 2 shows an exemplary hardware arrangement of components and devices of an RF lighting control system according to a preferred embodiment of the present invention.

Referring now to FIG. 2, an example hardware arrangement of components and devices in a building installation in accordance with a preferred embodiment of the present invention is displayed, and referred to herein generally as remote control system 200. As shown in FIG. 2, the system comprises, for example, one master control unit 202, five control devices 204A-204E, one repeater 206, and two car visor controls 208A, 208B, which represent a preferred combination of devices packaged and distributed for the retail market. In accordance with the teachings herein, each of the control devices 204A-204E is installed to replace a traditional mechanical switch.

In a preferred embodiment of the present invention, the control devices 204A-204E and the master control unit 202 are preferably pre-programmed to support the functionality described herein without requiring configuration and programming by the user. Preferably, the master control unit 202 includes a plurality of device control buttons 302A-302E. Each of the device control buttons 302A-302E is operable to control one, and only one, of the control devices 204A-204E. For example, a first device button 302A on master control unit 202 is operable to cause unit 202 to transmit commands to which only the first control device 204A will respond. The second device button 302B commands the second control device 204B; the third device button 302C commands the third control device 204C; and so forth. Preferably, the master control unit 202 transmits control information to the control devices 204A-204E in response to an actuation of one of the device control buttons 302A-302E. The control information includes a unique identifier of one of the control devices 204A-204E. For example, if the first device control button 302A is pressed, the control information may include an address uniquely identifying the control device 204A. Note that the unique identifiers are preferably not user selectable, e.g., not DIP switches.

Figure 3:
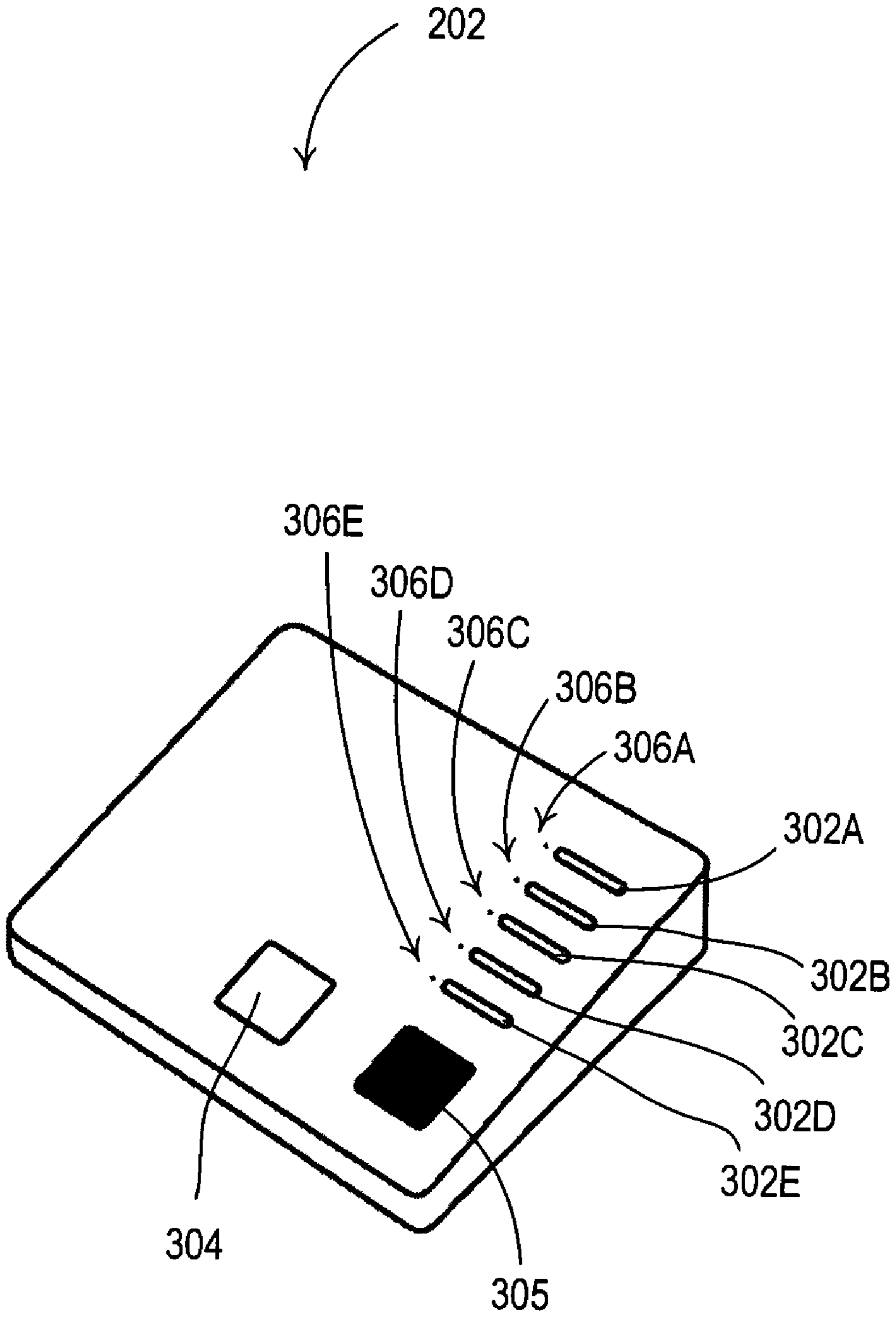
FIG. 3 shows a master control unit of the lighting control system of FIG. 2.

FIG. 3 illustrates an example master control unit 202 in accordance with the present invention. The example master control unit 202 shown in FIG. 3 is of the table top variety, plugs into a standard electric outlet, and can be placed anywhere in a home, such as, for example, on a bedside table. As noted above, the master control unit 202 can be provided in other various forms, including as a wall mounted device. The master control unit 202 includes the device buttons 302A-302E, which, when pressed, operate to cause the master control unit 202 to transmit the radio frequency signal 112 and instruct the control device 204A to turn the electrical device 110 on or off. The master control unit 202 comprises an "all-on" button 304 (described in greater detail below), which operates to turn on a combination of the control devices 204A-204E to various levels, thereby providing a lighting preset (or "scene"). The master control unit 202 further comprises an "all-off" button 305, which operates to turn off all of the control devices 204A-204E when pressed.

Figure 4:
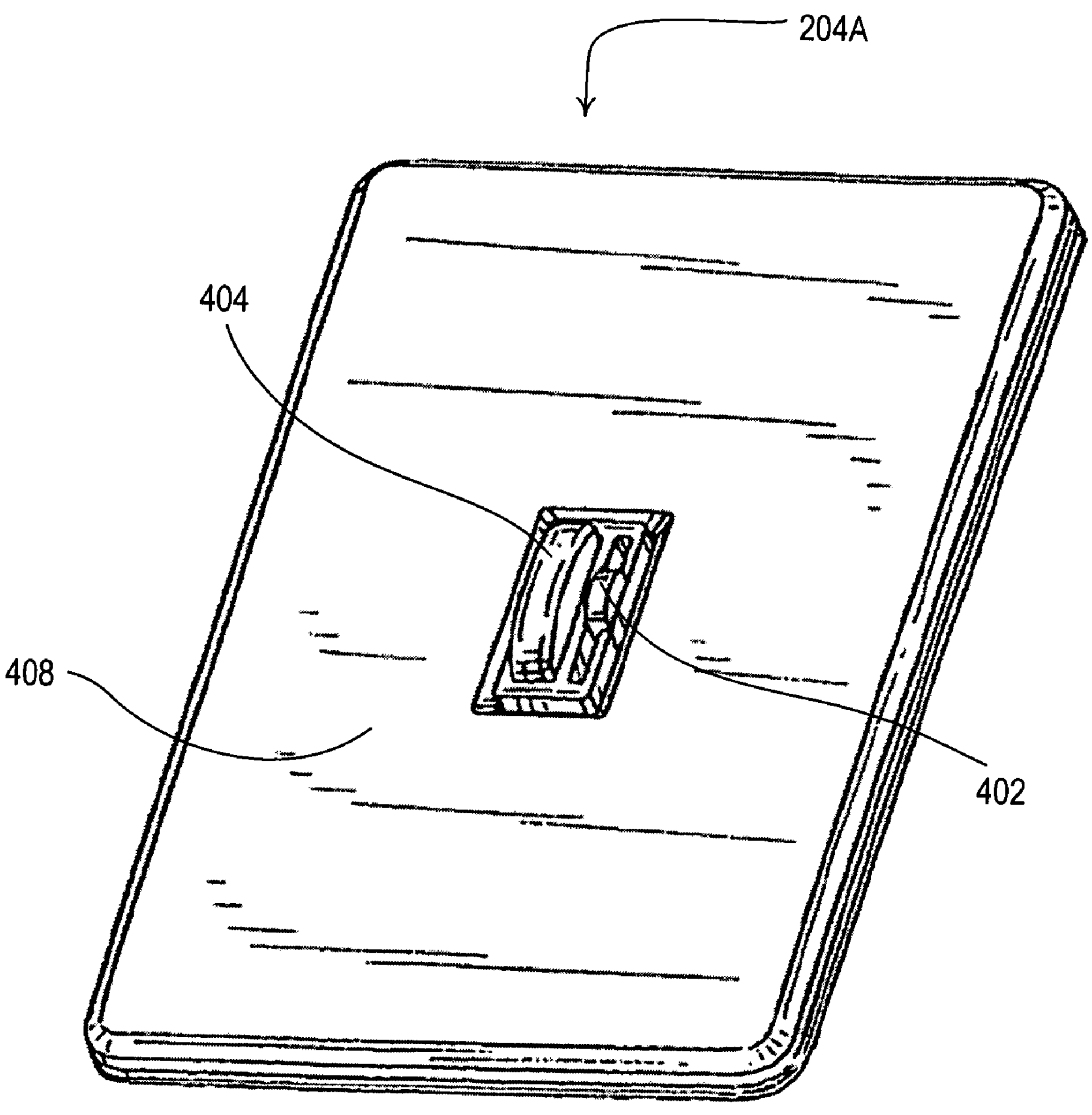
FIG. 4 illustrates a control device of the lighting control system of FIG. 2.

FIG. 4 illustrates an example of the control device 204A in accordance with a preferred embodiment of the present invention. As shown in FIG. 4, the control device 204A is equipped with a slider control 402 and an actuator, e.g., a button 404. An antenna (not shown) is preferably provided inside or behind the button 404 and is used for transmitting/receiving radio frequency signals to/from the master control unit 202, either directly or indirectly via the repeater 206.

The control device 204A is preferably arranged with a faceplate 408. The faceplate need not be limited to any specific form and preferably has a traditional style opening, such that the faceplate can be used for the control devices 204A-204E as well as a standard mechanical wall switch (i.e., the wall switch that the control device is replacing). According to NEMA Standards Publication ANSI/NEMA, page 7, WD 6-2002, published by the National Electrical Manufacturers Association, Rosslyn, Va., the entire disclosure of which is hereby incorporated by reference, a traditional style opening is a rectangular opening having a minimum width of 0.401+/−0.005 inch, an a minimum length of 0.925+/−0.005 inch.

The slider control 402 represents an improvement over prior art radio-frequency remote control systems that provide dimming functionality via a rocker switch (described above). The slider controls 402 are believed to be much more intuitive to use than rocker switches, and, further, enable a user to recognize at a glance the particular level set for a respective electrical device. Prior art rocker switches, in contrast, do not provide a convenient visual indication of a dimming level as slider controls do.

The buttons 302A-302E on master control unit 202 preferably function as follows. When the electrical device 210 is already on, and a user presses a respective device button (e.g., the device button 302A) on the master control unit 202 once, control information is transmitted to the respective control device (e.g., the control device 204A) to turn on the connected electrical device 210 to full power. Alternatively, when a user presses the device button 302A twice in rapid succession (i.e., double taps the button), the electrical device 210 turns on to the level defined by the position of the slider control 402 on the control device 204A. In this way, a user has greater control over the operation of the electrical devices 210 of the remote control system.

In a preferred embodiment, the master control unit 202 and the control devices 204A-204E are configured and programmed prior to retail distribution such that the buttons 302A-302E on the master control unit 202 automatically correspond to the respective control devices. For example, pressing the button 302D on the master control 262 will cause the control device 204D to toggle the attached lighting load. Thus, a user can control an individual electrical device 210 in accordance with the teachings herein, without the need to configure the system for use. Alternatively, the user could be provided the option of overriding the pre-programmed state of the master control unit 202 and the control devices 204A-204E by programming and configuring the system to accommodate individual preferences.

Unlike prior art systems which require a user to configure and associate respective buttons on a master control unit 202 with the control devices 204A-204E before the system is functional, the present invention provides a pre-configured system "out of the box", i.e., when the product is shipped. Thus, immediately after installation when energized for the first time, the system 200 is operable to function such that the first button 302A on the master control unit 202 controls the first control device 204A; the second button 302B on the master control unit 202 controls the second control device 204B; and so on.

The present invention eliminates the requirement in prior art systems that a user configure the system to assign a unique house address code (e.g., via a bit assignment ranging from 0-255). As noted above, unique house codes are required to prevent the system 200 from controlling unintended devices (e.g., those located at a neighboring house). In accordance with a preferred embodiment of the present invention, no programming is required by the user in order to establish a unique house code because the system is preferably shipped with preset system codes. The invention preferably defines a unique system address for each shipped system that is defined within the range of $0\text{-}2^{24}$. Thus, a user is not required to program a unique house code, because the present invention provides a large range of unique addresses such that no interference with neighboring systems is substantially ensured.

All of the devices of the system 200, i.e., the preferred combination of devices, are packaged and distributed together. The control devices 204A-204E preferably are labeled when shipped with a removable label having a printed number (or other designation) that associates a specific control device with one of the buttons 302A-302E on the master control unit 202. For example, the third control device 204C may have a label with the number three (3) included on its surface. Accordingly, when the control device 204C is removed from the packaging during installation, the end user is aware that the control device 204C will be operated by pressing the third button 302C of the master control unit 202.

Additionally, the buttons 404 of the control devices 204A-204E may each be of the same color as the corresponding buttons 302A-302E of the master control unit 202. For example, the button 404 of the control device 204A and the first button 302A of the master control unit 202 may both be colored red to emphasize to the user that the first button 302A controls the first control device 204A. Further, each of the buttons 302A-302E of the master control unit 202 (and each of the buttons 404 of the control devices 204A-204E) may be of different colors such that the buttons of the master control will be easily distinguishable and the control device that each button of the master control operates will be well known. For example, the buttons 302A-302E of the master control 202 and the buttons 404 of the control devices 204A-204E may have the colors red, blue, green, yellow, and black, respectively. Alternatively, the buttons of the control devices and the buttons of the master control unit may have similar textures, icons, text, or other designators.

The all-on button 304, shown in the example illustrated in FIG. 3, is operable to turn on all of the electrical devices 210 via a single button press. For example, when a user presses the all-on button 304 once, all of the electrical devices 210 controlled by the respective control devices 204A-204E function to turn on to full power, effectively ignoring the relative positions of local slider controls 402. As noted above, with respect to individual device buttons 302A-302E, a user can actuate a slider control 402 to adjust the status of the electrical device 210 after the device has been instructed to turn on to full power via the all-on button 304. In this way, a user can turn on all electrical devices 210 in the system to full power, and adjust the status of any one of the electrical devices 210 by actuating a respective local slider control 402. Similarly, the all-off button 305 is operable to turn off all of the electrical devices 210 in the system 200 via a single button press.

Alternatively, when a user presses the all-on button 304 twice (i.e., double taps the button), the electrical devices 210 preferably turn on to the levels defined by the respective local slider controls 402 on the control devices 204A, 204B, 204C, 204D, 204E. In this way, a user can turn on a lighting scene that is defined by the respective positions of the slider controls 402. This provides a convenient way to invoke one of many custom lighting scenes that are defined by relative positions of the slider controls 402. Of course, one skilled in the art will recognize that system 200 can be configured in other ways. For example, the all-on button 304 can function to turn on respective electrical devices 210 to levels defined by positions of local sliders when a user presses the all-on button once, and to turn on all electrical devices 210 to full power when double-tapped.

Referring back to FIG. 3, the master control unit 202 also includes a plurality of status indicators 306A-306E. For example, the master control unit 202 comprises five light emitting diodes (LEDs), which are each aligned with one of the device buttons 302A-302E. The status indicators 306A-306E preferably indicate the status of the electrical devices 210 connected to the respective control devices 204A-204E. Preferably, the status indicators 306A-306E, when lit, represent that the electrical devices 210 connected to the respective control devices 204A-204E are on. Conversely, the status indicators 306A-306E, when not lit, represent that the respective electrical devices 210 are off. For example, at the end of a day, a user can merely glance at master control unit 202 and determine that one electrical device 210, for example, the electrical device 210 controlled by control device 204D, was unintentionally left on since the status indicator 306D (next to the control button 304D that controls the control device 204D) is illuminated. The user can press the respective device button 302D on master control unit 202 to turn off the electrical device 210 connected to the control device 204D, thereby saving costs, for example, in terms of energy conservation and preserving the life of the lamp.

Figure 5:
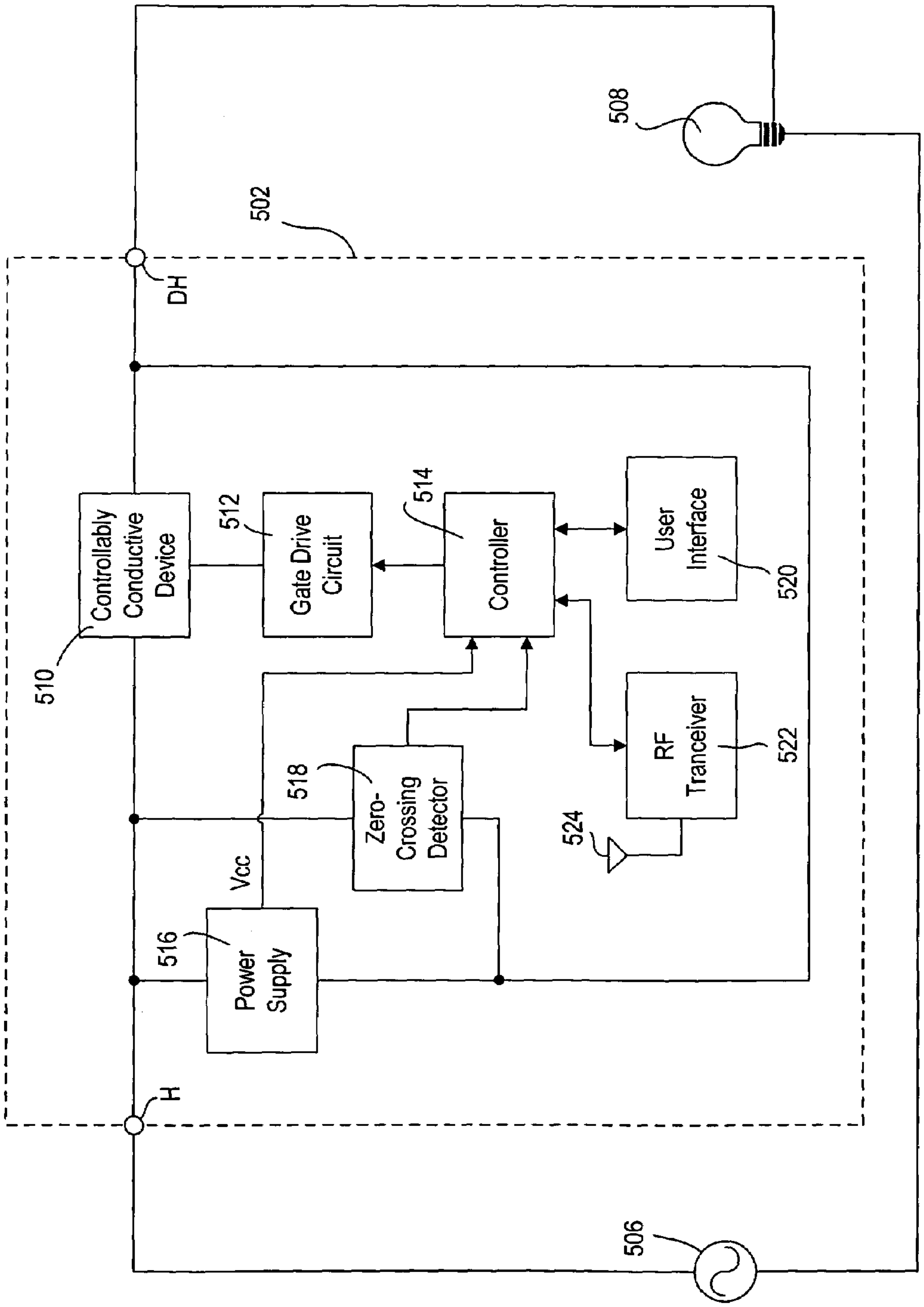
FIG. 5 is a simplified block diagram of a dimmer control device that may operate in the lighting control system of FIG. 2.

FIG. 5 is a simplified block diagram of an intelligent dimmer 502 that can be used in the described system 200. The dimmer 502 is coupled between an AC voltage source 506 and a lighting load 508. The dimmer 502 includes a controllably conductive device 510, such as a bidirectional semiconductor switch, for example, a triac. The controllably conductive device 510 may also be implemented as a relay or another type of semiconductor switch, such as two field effect transistors (FETs) in anti-series connection, a FET in a rectifier bridge, or one or more insulated gate bipolar junction transistors (IGBT). The controllably conductive device 510 has a control input (or gate), which is connected to a gate drive circuit 512. The input to the gate renders the controllably conductive device 510 selectively conductive or non-conductive, which in turn controls the power supplied to the lighting load 508.

The gate drive circuit 512 provides control inputs to the controllably conductive device 510 in response to command signals from a controller 514. The controller 514 is preferably implemented as a microcontroller, but may be any suitable processing device, such as a programmable logic device (PLD), a microprocessor, or an application specific integrated circuit (ASIC). A power supply 516 is coupled across the controllably conductive device 510 and generates a DC voltage Vcc to power the controller 514. The power supply 516 is only able to charge when the controllably conductive device 510 is non-conductive and there is a voltage potential developed across the dimmer 502.

A zero-crossing detector 518 determines the zero-crossing points of the AC voltage source 506 and provides this information to the controller 514. A zero-crossing is defined as the time at which the AC supply voltage transitions from positive to negative polarity, or from negative to positive polarity, at the beginning of each line voltage half-cycle. The controller 514 determines when to turn on (or turn off) the controllably conductive device 510 each half-cycle by timing from each zero-crossing of the AC supply voltage.

A user interface 520 is coupled to the controller 514 and provides a plurality of buttons for receiving inputs from a user and a plurality of light emitting diodes (LEDs) for providing feedback to the user. The user interface 520 preferably includes the button 404 and the slider control 402 as shown in FIG. 4. The controller 514 will toggle the state of the lighting load 508 (i.e., from on to off and vise versa) in response to an actuation of the button 404. The slider control 402 is operable to provide dimming of the lighting load 508. In response to inputs from the slider control 402, the controller 514 controls the conductive state of the controllably conductive device 510 thereby to affect the dimming level of the lighting load 508.

The dimmer 502 further includes an RF transceiver 522 for transmitting and receiving RF communication signals from the other devices of the system 200 via an antenna 524. Once the controller 514 receives inputs from the user interface 520, the controller 514 then controls the lighting load 508 to the desired level set by the slider control 402, or to off, and then transmits a radio frequency signal to the master control unit 202 to identify the status of the lighting load 508, which may be the intensity of the lighting load, or whether the lighting load is on or off, as determined by the controller 514.

In a preferred embodiment, the button 404 is operable to command the controller 514 to operate the lighting load 508 to perform in various ways. For example, when the lighting load 508 is off and a user manually actuates, i.e. presses, the button 404 once, the controller 514 preferably causes the lighting load 508 to turn on at the light level set by the slider control 402. Alternatively, if a user presses the button 404 twice in short succession (i.e., double-taps the button), the lighting load 508 is controlled to turn on to full power, effectively ignoring the position of the slider control 402. When the slider control 402 is thereafter actuated (by a user), the intensity of the lighting load 508 changes to the level defined by the slider control 402.

Preferably, the lighting load 508 does not appear to turn on instantly when button 404 is pressed, instead, the lighting load fades on rapidly, thereby providing a more attractive and pleasing sensation when the lighting load turns on. When the lighting load 508 is already on and a user presses button 404 once, the lighting load turns off in a similar way, such that the lighting load dims rapidly until fully off. Alternatively, when the lighting load 508 is already on and a user presses and holds button 404 down for a few moments, the lighting load is controlled to turn off by fading slowly, for example over a period of five seconds. This provides a way for users to enjoy a gradual reduction in light.

Figure 6:
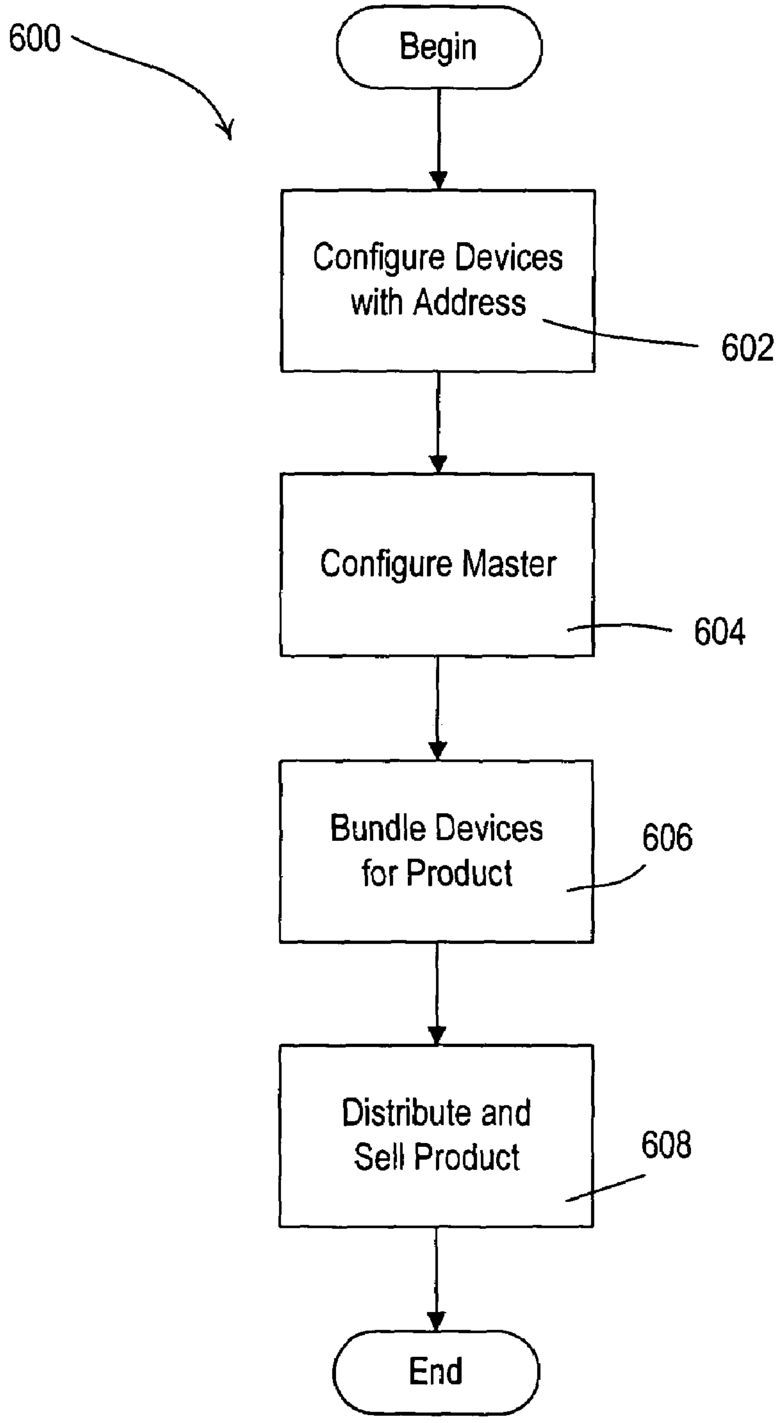
FIG. 6 is a flow chart that represents a process associated with configuring and distributing the remote control system of the present invention.

FIG. 6 illustrates a flowchart 600 that represents a process associated with configuring and distributing the remote control system 200. The process defined in the flowchart 600 preferably begins after the hardware devices (e.g., in a preferred embodiment, one master control unit 202, five control devices 204A-204E, one repeater 206, and two car visor controls 208A, 208B) have been manufactured, assembled and the devices are configured on manufacture to operate without requiring programming at installation. While the steps in the flowcharts illustrated herein are presented in a sequential order, one skilled in the art will recognize that the present invention is not limited to the precise sequence of operation illustrated in the flowcharts.

At step 602 of the flowchart 600, the master control unit 202, the control devices 204A-204E, the repeater 206, and/or the car visor controls 208A, 208B are configured with a unique house (system) address. As noted above, the present invention is preferably pre-configured with a unique house address by assigning a bit value selected from the range of $0\text{-}2^{24}$. In this way, interference with neighboring systems is minimized.

After the master control unit 202, the control devices 204A-204E, the repeater 206, and/or the car visor controls 208A, 208B are configured with a unique house address at step 602, the buttons 302A-302E on the master control unit 202 are associated with the respective control devices at step 604. Thus, pressing particular buttons 302A-302E on the master control unit 202 affects the status of the respective electrical devices 210 connected to control devices 204A-204E.

At step 606, the components comprising system 200 are bundled and packaged together. For example, one master control unit 202, five control devices 204A-204E, one repeater 206, and two car visor controls 208A, 208B are bundled and packaged. Of course, one skilled in the art will recognize that other devices may be added or substituted, or that fewer or more devices may be bundled, packaged and distributed without departing from the spirit of the invention. After the devices are bundled and packaged into a single product, the product is distributed and sold in the retail market at step 608.

Thus, in accordance with the present invention, a remote control system 200 is provided such that individual devices can be installed and wired into an existing home by a non-technical or lay person, and the system is fully operable without the need for initial and/or additional programming, setup and/or configuration.

Figure 7:
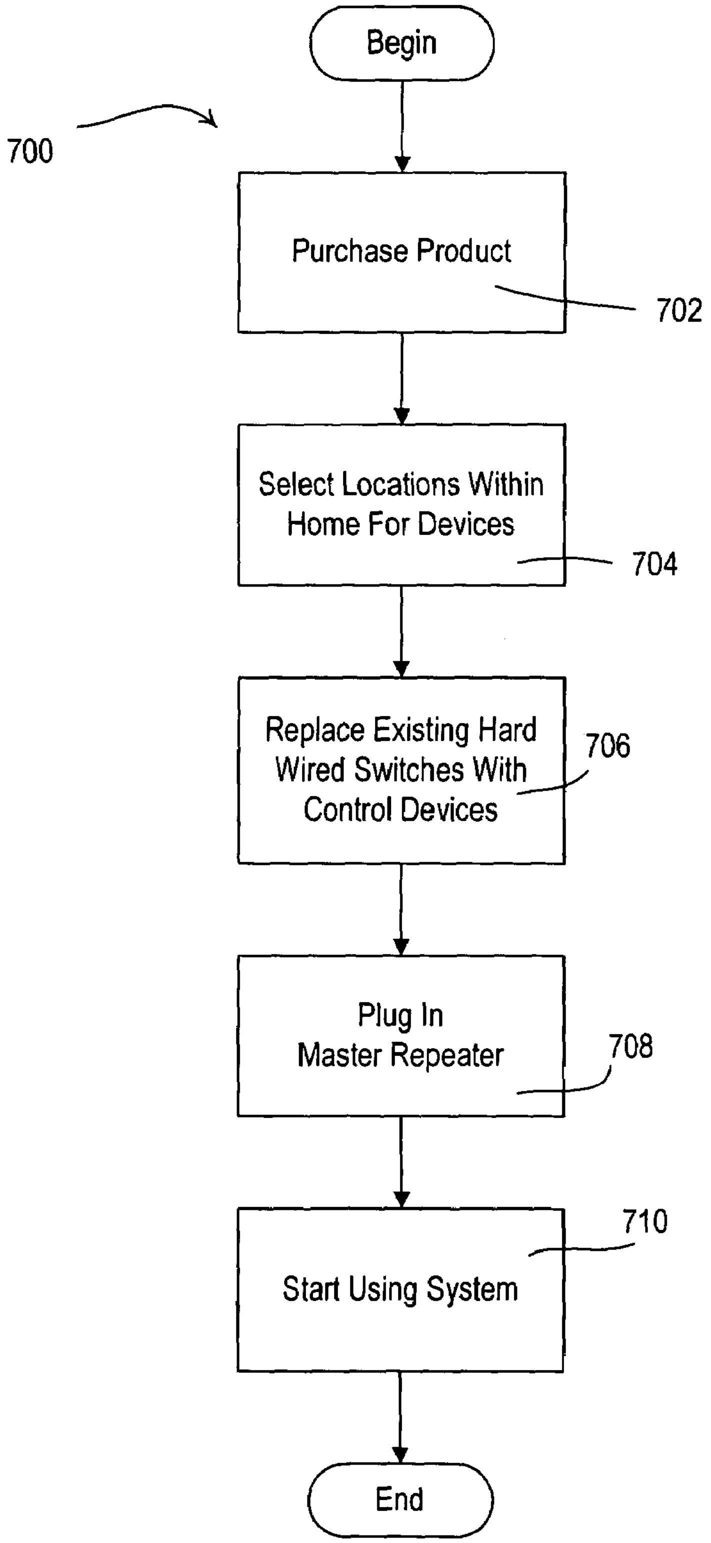
FIG. 7 illustrates a flow chart that includes the process associated with installing the present invention from the perspective of a retail consumer.

FIG. 7 is a flowchart 700 that illustrates the processes associated with installing the system 200 from the perspective of a retail consumer (e.g., a homeowner). At step 702, a user purchases the packaged devices included in the system 200 from a retail establishment. In the example described with reference to FIG. 7, the master control unit 202 is of the tabletop variety. At step 704, the user selects the locations in his home where the dimmer controls are desired. For example, at the bottom of a stairwell, the user decides to replace an existing switch with the dimmer 502 of the present invention (as shown in FIG. 5). After the locations are selected, the user replaces the existing hard-wired switches with the control devices 204A-204E provided with the packaged devices at step 706. More specifically, after turning off power at the circuit breakers, the user removes the faceplates from the existing switches, disconnects the wires from the existing switches, connects the wires to the terminal leads provided with the replacement control devices 204A-204E and then replaces the faceplates. Once the control devices 204A-204E are installed, the user plugs in the master control unit 202 and the repeater 206 at step 708 and finally restores power to the system. The devices automatically communicate and the system is immediately usable at step 710.

Thus, in accordance with the examples described with reference to the flowcharts shown in FIGS. 6 and 7, devices included in system 200 are pre-configured and distributed such that users can install system 200 without the need to program, configure and/or set up the system for operation.

Although the words "device" and "unit" have been used to describe the elements of the lighting control systems of the present invention, it should be noted that each "device" and "unit" described herein need not be fully contained in a single enclosure or structure. For example, the master control unit 202 of FIG. 2 may comprise a plurality of buttons in a wall-mounted device and a processor that is included in a separate location.

Although the embodiments described herein relate to remote control systems that operate by radio frequency, the invention is not so limited. In an alternative embodiment, remote control operations are provided via communications over infrared signals. In this alternative embodiment, master control unit 202 may be omitted. Typically, a direct infrared signal must be received by the control devices 204A-204E, thereby precluding the control devices from receiving infrared signals transmitted by the master control unit 202 between rooms and/or floors. It is envisioned, however, that system 200 is configurable to transmit and receive infrared signals in order to control electrical devices 210, and wherein the system is pre-programmed and pre-configured to operate without requiring a user to set up the system.

Further, although the present invention is described by way of a pre-programmed system, the invention is not so limited. In yet another, alternative embodiment of the present invention, a user can override the "factory default" configuration of system 200 and can program/configure system 200 to accommodate individual preferences. For example, the user can operate system 200 in accordance with prior art methods to change the settings of one or more controls and buttons on the respective devices. In this way, system 200 provides increased flexibility and functionality over prior art systems.

Although the present invention has been described in relation to particular embodiments thereof, many other variations and modifications and other uses will become apparent to those skilled in the art. Therefore, the present invention should not be limited by the specific disclosure herein.

What is claimed is:

1. A system for remotely controlling at least two electrical devices, the system comprising:

a master control unit operable to transmit signals containing control information for controlling the status of the electrical devices; and at least two control devices operable to receive the signals from the master control unit, each of the control devices respectively electrically connected to at least one of the electrical devices and responsive to the control information to control the at least one of the electrical devices;

wherein the control information includes a unique identifier of at least one of the control devices, the unique identifier not being user selectable;

wherein the master control unit and the control devices are pre-configured such that the master control unit is operable to transmit the signals to the control devices, and the control devices are operable to receive the signals from the master control unit and control the status of the at least one electrically connected electrical device in response to the control information containing the unique identifier of the respective control device, immediately upon installing and providing power to the system in a building structure.

2. The system of claim 1, wherein the at least two control devices are operable to transmit a signal containing status information to the master control unit, and wherein the status information represents the status of the at least one electrical device connected to the at least one control device.

3. The system of claim 1, wherein the at least two control devices further each comprise a dimmer control operable to dim the electrical device connected thereto.

4. The system of claim 3, wherein the at least two control devices are operable to transmit status information to the master control unit, wherein the status information represents the status of the respective electrical device, or the setting of the respective dimmer control, or both.

5. The system of claim 1, wherein at least one of the at least two electrical devices is a lamp.

6. The system of claim 1, wherein the signals comprise radio frequency signals or infrared signals.

7. The system of claim 1, further comprising a repeater device operable to receive the signals from the master control unit and to transmit the signals to at least one of the control devices, wherein the repeater is configured to communicate with the master control unit and the control devices immediately upon installing and providing power to the system in a building structure.

8. The system of claim 1, wherein the master control unit and the at least two control devices are pre-configured with a unique address for communication.

9. The system of claim 1, wherein the address is a bit assignment and selected from the range of $0\text{-}2^{24}$.

10. The system of claim 1, further comprising at least one portable control device operable to transmit a control signal to the master control unit to affect a status of at least one electrical device connected to the at least two control devices, wherein the at least one portable control device is configured to communicate with the master control unit immediately upon installing the master control unit in a building structure.

11. The system of claim 10, wherein the portable control device is mountable in an automobile.

12. The system of claim 1, wherein the master control unit is further operable to transmit a signal to each of the control devices substantially simultaneously to control each of the control devices substantially simultaneously.

13. The system of claim 1, wherein the master control unit and the at least two control devices are pre-programmed, but can be reprogrammed in a customized way by a user.

14. A method for providing a remote control system operable to control at least two electrical devices, the method comprising the steps of:

providing a master control unit operable to transmit signals containing control information for controlling the electrical devices;

providing at least two control devices, each of the control devices respectively electrically connected to at least one of the electrical devices and responsive to the control information for controlling the at least one of the electrical devices, the control information including a unique identifier of at least one of the control devices, the unique identifier not being user selectable; and pre-configuring the master control unit and the control devices such that the master control unit is operable to transmit signals to the control devices, and the control devices are operable to receive the signals from the master control unit and control the status of the at least one electrically connected electrical device in response to the control information containing the address of the respective control device, immediately upon installing and providing power to the master control unit and the control devices in a building structure.

15. The method of claim 14, further comprising the step of: transmitting a respective signal containing status information from the at least one control device to the master control unit;

wherein the status information represents the status of the at least one electrical device connected to the at least one control device.

16. The method of claim 14, further comprising the step of: providing dimmer controls in each control device operable to dim the electrical device connected thereto.

17. The method of claim 16, further comprising the step of: transmitting a signal containing status information from the at least two control devices;

wherein the status information represents the status of the respective electrical device, or the setting of the respective dimmer control, or both.

18. The method of claim 14, further comprising the step of: controlling the status of at least one electrical device comprising a lamp.

19. The method of claim 14, wherein the signals comprise radio frequency signals or infrared signals.

20. The method of claim 14, further comprising the steps of:

providing a repeater device operable to receive the signals from the master control unit and to transmit the signals to at least one of the control devices; and configuring the repeater device to communicate with the master control unit and the control devices immediately upon installation in a building structure.

21. The method of claim 14, wherein the master control unit and the at least two control devices are pre-configured with a unique address for communication.

22. The method of claim 14, wherein the address is a bit assignment and selected from the range of $0\text{-}2^{24}$.

23. The method of claim 14, further comprising the steps of:

providing at least one portable control device operable to transmit a control signal to the master control unit to affect a status of the at least one electrical device; and configuring the at least one portable control device to communicate with the master control unit immediately upon installing the master control unit in a building structure.

24. The method of claim 14, further comprising the step of: mounting the portable control device in an automobile.

25. The method of claim 14, wherein the master control unit and the at least two control devices are preprogrammed, but can be reprogrammed in a customized way by a user.

26. A two-way radio frequency lighting control system, comprising:

a master control, including a plurality of manual actuators; and a plurality of dimmers, the number of dimmers not exceeding the number of manual actuators;

wherein, after the lighting control system is installed in an intended end user location, and prior to the first time the lighting control system is energized in the intended end user location, each of the manual actuators is operative to affect the status of one, and only one, of the plurality of dimmers.

27. A two-way radio frequency lighting control system, comprising:

a master control, including a plurality of manual actuators; and a plurality of dimmers, the number of dimmers not exceeding the number of manual actuators;

wherein, after the lighting control system is installed in an intended end user location, and prior to the first time the lighting control system is energized in the intended end user location, there is a one-to-one correspondence of dimmers to actuators such that each of the plurality of dimmers is adapted to have its status affected by actuation of one, and only one, of the plurality of manual actuators.

28. A lighting control system, comprising:

a master control including:

a plurality of master manual actuators;

a master controller, operatively coupled to the master manual actuators;

a plurality of master status indicators, operatively coupled to the master controller;

a master radio frequency transmitter-receiver, operative coupled to the master controller; and a master antenna, operatively coupled to the master transmitter-receiver; and a plurality of dimmers, the number of dimmers not exceeding the number of master manual actuators, each dimmer including:

a dimmer manual on/off actuator;

a dimmer slider actuator;

a dimmer controller, operatively coupled to the dimmer manual on/off actuator and to the dimmer slider actuator;

a dimmer controllably conductive device, operatively coupled to the dimmer controller;

a dimmer radio frequency transmitter-receiver, operatively coupled to the dimmer controller; and a dimmer antenna, operatively coupled to the dimmer radio frequency transmitter-receiver;

the master controller and each of the plurality of dimmer controllers programmed, prior to installation in an intended end user location, such that each master manual actuator is operative to cause a change in status of one, and only one, of the plurality of dimmers.

* * * * *